United States Patent
Faitelson et al.

(10) Patent No.: US 10,152,528 B2
(45) Date of Patent: *Dec. 11, 2018

(54) DELEGATING PORTIONS OF AN INDEX OF AN ENTERPRISE

(71) Applicant: VARONIS SYSTEMS, LTD., Herzliya (IL)

(72) Inventors: Yakov Faitelson, New York, NY (US); Ohad Korkus, New York, NY (US); Ophir Kretzer-Katzir, Tenafly, NJ (US)

(73) Assignee: VARONIS SYSTEMS, LTD., Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/904,370

(22) Filed: Feb. 25, 2018

(65) Prior Publication Data

US 2018/0181635 A1 Jun. 28, 2018

Related U.S. Application Data

(63) Continuation of application No. 14/230,012, filed on Mar. 31, 2014, now Pat. No. 9,940,376.

(51) Int. Cl.
G06F 17/30 (2006.01)
(52) U.S. Cl.
CPC .. G06F 17/30575 (2013.01); G06F 17/30336 (2013.01)
(58) Field of Classification Search
CPC ................................. G06F 17/30575
USPC ....................... 707/610, 626, 758
See application file for complete search history.

(56) References Cited

U.S. PATENT DOCUMENTS

| | | | | |
|---|---|---|---|---|
| 6,934,723 B2* | 8/2005 | Breiter | ............... | H04L 29/06 707/202 |
| 8,694,522 B1* | 4/2014 | Pance | ............... | G06F 17/30867 707/706 |
| 2011/0289055 A1* | 11/2011 | Pothering | ......... | G06F 17/30575 707/626 |
| 2015/0127656 A1 | 5/2015 | Faitelson | | |

OTHER PUBLICATIONS

X Bai et al: D3.4: Distributed Searching in Future Internet. Information and Communication Technologies (ICT) Programme. Project No. FP7-ICT-248036, Coast, Jun. 15, 2012, pp. 1-74. URL: http://www.coast-fp7.eufpublic/COAST_D3.4_YAHOO_BM_FF.pdf.

* cited by examiner

*Primary Examiner* — Chelcie L Daye
(74) *Attorney, Agent, or Firm* — Soroker Agmon Nordman

(57) ABSTRACT

A method for enabling querying independently of a computerized system about objects thereof, comprising providing a computer linked to the computerized system with replications of entries of an index of the computerized system that comprise data derived from contents of the objects, where said entries correspond to a subset of objects that are identified as related objects, thereby enabling the computer, based on the provided replications, to query locally and independently of the computerized system about the related objects according to contents thereof, and an apparatus for performing the same.

20 Claims, 3 Drawing Sheets

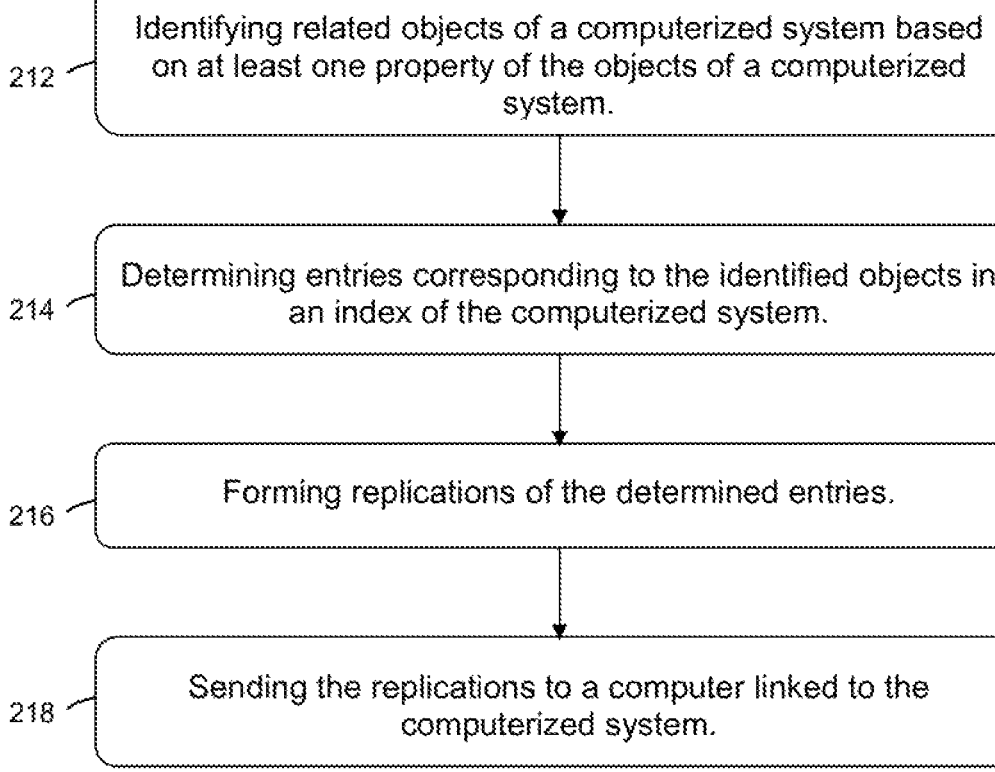

DELEGATING PORTIONS OF AN INDEX OF AN ENTERPRISE

BACKGROUND

The present disclosure generally relates to indexing of objects of and enterprise, and more specifically to replicating portions of the index of an enterprise in an external computer.

Computers systems or computerized systems, particularly such of an enterprise, generally comprise numerous linked computers that store and handle plenty of objects such as files. Thus, in some cases at least, in order to efficiently and quickly retrieve objects, an index or inventory of objects is constructed and maintained. Generally, tracking objects in the computerized system may affect the computerized system such as in terms of response time or cost of equipment.

SUMMARY

One exemplary embodiment of the disclosed subject matter is a method for enabling querying independently of a computerized system about objects thereof, comprising providing a computer linked to the computerized system with replications of entries of an index of the computerized system that comprise data derived from contents of the objects, where said entries correspond to a subset of objects that are identified as related objects, thereby enabling the computer, based on the provided replications, to query locally and independently of the computerized system about the related objects according to contents thereof, and an apparatus for performing the same.

Another exemplary embodiment of the disclosed subject matter is an apparatus for enabling querying independently of a computerized system about objects thereof, comprising a computerized system comprising an at least one storage device storing an index of objects of the computerized system and an at least one processing component, wherein the computerized system is configured by a program operable in the at least one processing component to provide an at least one computer with replications of entries of the index that comprise data derived from contents of the objects, where said entries correspond to a subset of objects that are identified as related objects, thereby enabling the at least one computer, based on the provided replications, to query locally and independently of the computerized system about the related objects according to contents thereof.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described.

Figure 1A:
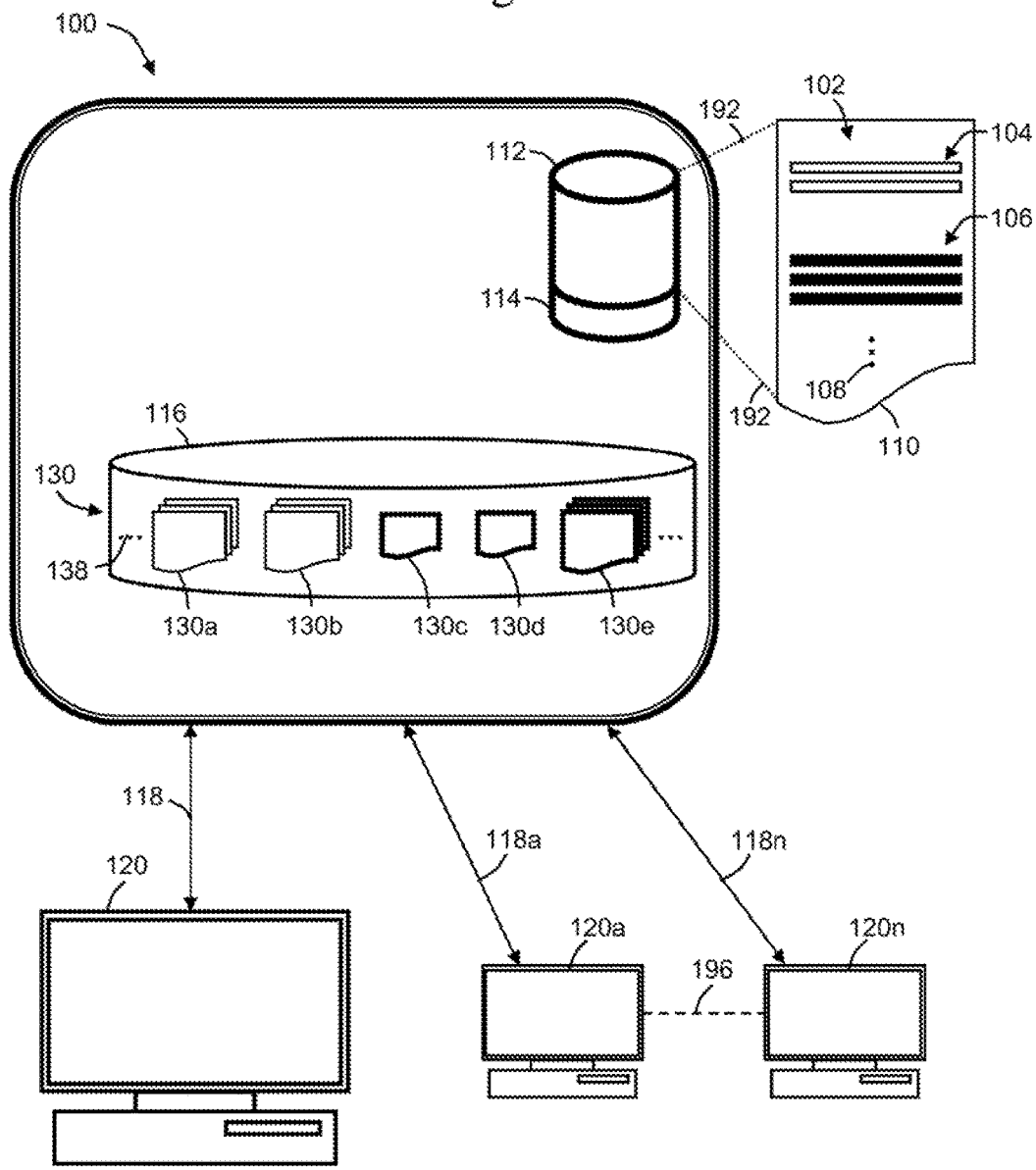

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 1B:
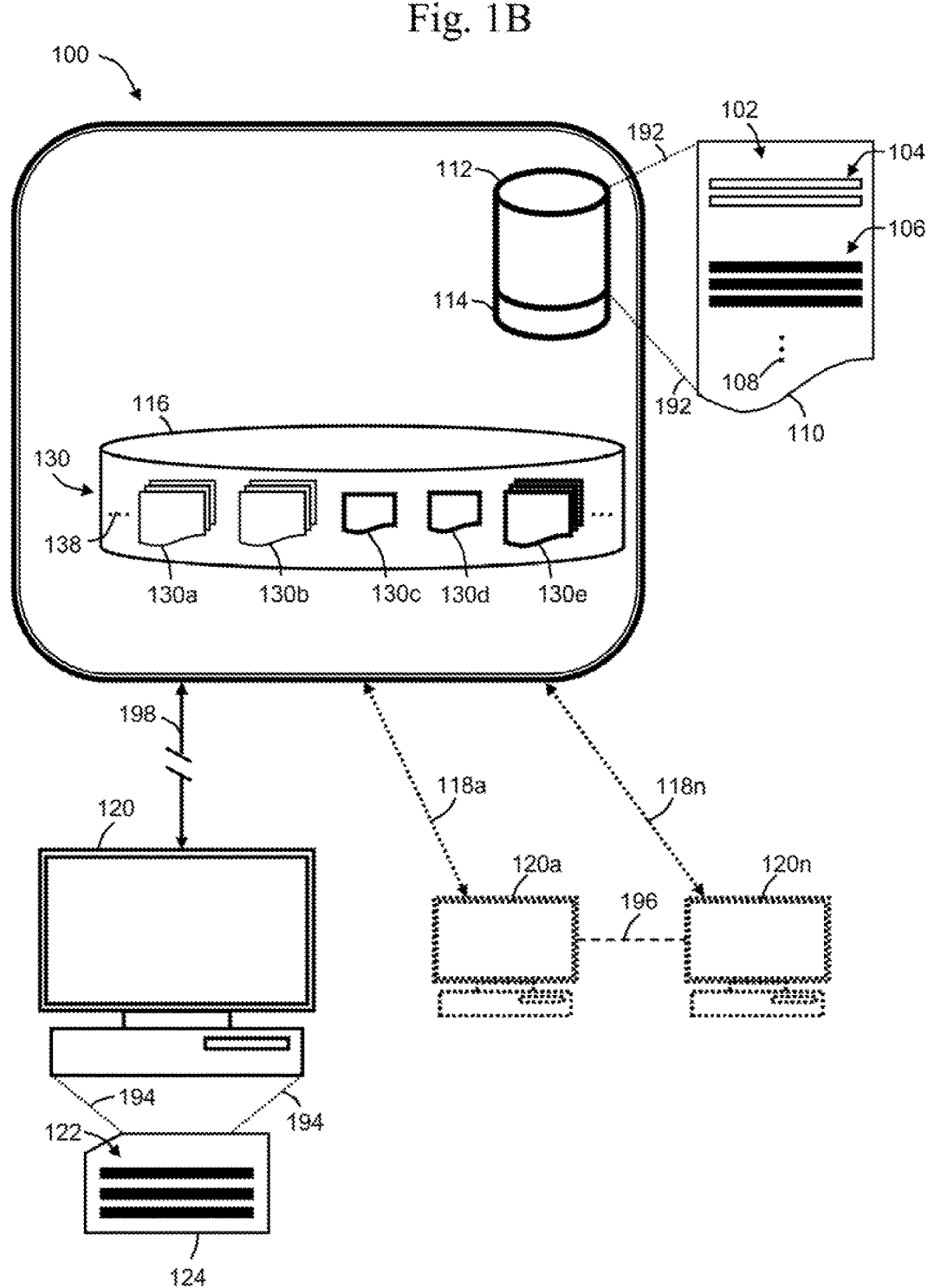

FIG. 1A schematically illustrates an enterprise as a computerized system and a client computer connectable and/or connected to the enterprise, according to exemplary embodiments of the disclosed subject matter;

FIG. 1B schematically illustrates the enterprise of FIG. 1A and the client computer disconnected from the enterprise after receiving entries of an index thereof, according to exemplary embodiments of the disclosed subject matter;

FIG. 2A outlines operation of a computerized system for enabling querying independently of the enterprise about objects thereof, according to exemplary embodiments of the disclosed subject matter; and FIG. 2B outlines operations of a computerized system for enabling querying independently of the enterprise about objects thereof as an exemplary elaboration of FIG. 2A, according to exemplary embodiments of the disclosed subject matter.

DETAILED DESCRIPTION

In the context of the present disclosure, without limiting, the term 'enterprise' implies a computerized system comprising a plurality of computers communicating therebetween and having and/or sharing and/or communicating with a data storage device. The enterprise is also referred to as a 'computerized system' and the data storage device also referred to as 'data storage' or 'storage'.

For brevity, referring to an operation of the enterprise, such as sending of data, implies an operation of one or more components and/or computers of the enterprise.

Generally, without limiting, an enterprise comprises several computers in a range between about 10 computers and about 1000 computers or more. Optionally, an enterprise comprises less than 10 computers, not precluding having one computer as, for example, a mainframe computer.

In the context of the present disclosure, without limiting, the term 'object' implies a data element of the enterprise, such as a document, a file, an email, share point list, or a database and/or a construct that contains or associated with other objects, such as a folder or a directory.

In the context of the present disclosure, without limiting, the term 'property' of an object implies a feature or aspect of and/or respective and/or corresponding to an object. For example, a name, an address in a storage device and/or a link to a network storage device, an ownership, an access history of an object, an access permissions to an object, a classification, or an attribute of an objects such as set or maintained by an operating system such as creation date and time of an object, entity or person creating and/or amending an object, size of an object, type of an object, tags with information about an object, and so forth., Accordingly, properties of an object comprise one or more property of and object, and likewise, an object corresponds to the properties thereof.

In some cases or embodiments, without limiting, referring to properties of an object implies referring to part of the properties and/or to a property of the object. For brevity, according to the context, referring to properties implies properties of an object and/or objects.

In the context of the present disclosure, without limiting, the term 'index' implies a constructs such as an inventory or a catalog having data or information of and/or about objects by the contents thereof. The data or information about an object and contents thereof is constructed in an entry of the index, so that the entry corresponds to or is respective to object and vise versa. Thus, the index reflect Generally and without limiting, an index comprises elements of the contents of objects, such as keywords and/or phrases and/or extracts and/or citations and/or excerpts from the objects and/or derivations thereof such as stems, and at least optionally information about the locations of the elements in the objects. In some embodiments, the index comprises properties of objects or, alternatively, the properties are separately stored and maintained.

In the context of the present disclosure, without limiting, the term 'indexing' or an index operation imply compiling and constructing data or information about and/or of contents of objects in an index.

For brevity, properties having one or more common or related elements and/or similar elements and/or other relationships therebetween are referred to as similar properties and/or as related properties, and objects respective or corresponding to similar properties are referred to as similar objects and/or as related objects.

In the context of the present disclosure, without limiting, the term 'indexing server' denotes one or more data processing apparatuses configured to index content of objects of the enterprise and to maintain the index. In some embodiments, the indexing server is configured to store the properties of the objects in one or more storage devices such as in a database where, optionally, the database comprises an index or a part thereof.

In the context of the present disclosure, without limiting, the term 'client computer' refers to a computer and/or a computerized device such a smartphone or tablet computer, that externally linked and/or linkable to the enterprise such as to a component of the enterprise. For example, the client computer is linkable to the enterprise by a communication facility or facilities, such as by a network as the internet, or a wireless or a telephonic mobile communication or any method of communication or a combination of communication methods. In the context of the present disclosure, unless otherwise stated, the term 'connect' and variations thereof refer to linking by way of a communication facility or facilities.

In the context of the present disclosure, unless otherwise stated, referring to a local operation with respect to a client computer implies an operation performed in the client computer.

In the context of the present disclosure, without limiting, the term 'connect' or 'link' implies either directed communication connection and/or indirect communication such as via a network and/or interconnections of components.

In some embodiments, without limiting, a client computer is operated and/or controlled by a human operator which is also referred to a user. In some embodiments, referring to an operation of a client computer implies an operation controlled by a human operator of the client computer.

In the context of the present disclosure, without limiting, referring to a client computer being on-line and off-line with respect an enterprise implies that the client computer is linked or not lined to the enterprise, respectively.

The terms cited above denote also inflections and conjugates thereof.

Generally, an enterprise stores numerous objects that are indexed in entries of an index of the enterprise.

A common or an ordinary scenario with an enterprise is where a client computer linked to the enterprise queries about objects of the enterprise, such as in searching for the objects, based on the contents of the objects as reflected or manifested in the entries of the index.

One technical problem dealt by the disclosed subject matter is reducing a computational and/or a communication load of an enterprise in queries about objects of the enterprise by client computers linked to the enterprise.

Another technical problem dealt by the disclosed subject matter is eliminating a communication load in querying about objects of the enterprise by client computers.

A technical solution according to the disclosed subject matter is configuring the enterprise to replicate in the client computers at least a part of the index thereof, thereby enabling the client computers to locally query about objects of the enterprise that correspond to entries of the replications without communicating with the enterprise and querying the index thereof.

In some embodiments, the enterprise provides the client computers with the replications responsive to a certain circumstance or an event. For example, responsive to a request from the client computers or responsive to the client computers linking to the enterprise. Optionally or alternatively, the enterprise actively 'pushes' the replications to the client computers.

Thus, once the replications are received and stored in the client computers, the client computers can locally query about objects that correspond to entries of the replications independently of the enterprise and regardless of linkage with the enterprise.

A potential technical effect of the disclosed subject matter is client computers operative to query about objects of the enterprise independently of the enterprise.

It is noted that referring to client computers does not preclude one client computer.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

In some embodiments according to the present disclosure, an enterprise provides duplications or replications of parts of an index thereof, such as entries of the index, to one or more client computers. Thus, having received the duplications or replications of parts of the index, the one or more client computers can locally and independently of the enterprise query about objects that correspond to entries in the parts of the index, thereby at least potentially alleviating processing load and/or communications bandwidth demands of the enterprise and the one or more client computers.

In some embodiments, the enterprise provides a client computer with replications of parts of the index of the enterprise based on some commonality and/or relations between objects, with a potential rationale that if one or more of the objects are queried about there is a likelihood that other related objects would be required of called for later on.

For example, in case a client computer requested and/or queried the enterprise about one or more objects thereof, the enterprise responsively provides the client computer with replications of entries of the index the correspond to the one or more objects together with replications of entries that correspond to similar objects of the enterprise as determined by properties of the objects, such as by ownership, access histories, permissions or classifications.

As another example, when a client computer is about to switch from an on-line state to an off-line state, such as for traveling, the client computer requests the enterprise for replications of index entries corresponding to objects that the operator of the client computer is interested in or is associated with. Responsively, the enterprise provides replications of the requested entries, optionally together with replications of entries that correspond to similar objects.

In some embodiments, responsive to the client computer linking and/or connecting to the enterprise, the enterprise provides the client computer with replications of entries of the index that correspond to objects that relate to and/or associated with the client computer and/or identity thereof and/or operator thereof. For example, responsive to detection by the enterprise that the client computer is connected, the enterprise provides to the client computer replications of entries that corresponds to objects for which the operator of the client computer has ownership and/or access permissions.

In some embodiments, the enterprise initiates sending duplications or replications of parts of the index to a client computer. For example, encountering numerous queries by a client computer about objects of the enterprise, the enterprise reacts by sending, or 'pushing', to the client computer replications of entries corresponding to the recently queried objects, optionally with replications of entries corresponding to similar objects. A potential rationale for such a reaction by the enterprise is that there is a considerable likelihood that the client computer would further query about the objects and/or similar ones. Thus, the enterprise pushes the replications rather than responding to queries and/or requests of the client computer.

As another example, when the client computer is linked to the enterprise and creates and/or modifies objects of the enterprise, in response the enterprise pushes replications of the entries that correspond to the created and/or modified objects to the client computer, optionally together with replication of entries corresponding to objects previously created and/or modified by the client computer. A potential rationale for pushing replications of entries corresponding to created and/or modified objects to the client computer is allowing the client computer to query about objects the client computer has handled taking into consideration that potentially the client computer is likely to query about such objects. It is noted that the client computer has handled objects by creating and/or modifying objects that are considered similar such as by ownership and/or access permissions of the client computer and/or operator thereof.

In some embodiments, the enterprise provides replications of entries to a plurality of client computers. For example, replications of entries corresponding to objects for which a first client computer and/or operator thereof have ownership and/or access permission are provided to the first client computer. Likewise, replications of entries corresponding to objects for which a second client computer and/or operator thereof have ownership and/or access permission are provided to the second client computer. Further, both the first client computer and the second client computer are provided with replications of entries corresponding to objects having a common property with the objects corresponding to the provided replications, such as a common classification.

In some embodiments, two or more client computers exchange or transfer replications of entries therebetween. For example, a first client computer locally queries about an object by entries thereof. In case no such object is identified, the first client computer tries to communicate with other client computers that might share a communication and/or network and queries the other client computers for replications of entries corresponding to the queried object. If such replications entries are found, the client computer with the found replications sends the found replications to the first client computer. It is noted that the exchange of replications of entries, at least in some embodiments, is carried out independently of the enterprise and without interrupting or loading the enterprise.

If no replication or replications of entries corresponding to the queried object are found in other client computers, the first client computer may or does communicate with the enterprise and obtains therefrom the replications of entries that correspond to the queried object.

In some embodiments, a client computer communicates with the enterprise for further replication of entries, such as corresponding to queried objects, regardless of other client computers.

It is noted that by providing the client computer with suitable duplications or replications of parts of the index of the enterprise, the need for the client computer to further communicate with the enterprise is diminished, at least potentially. For example, providing replications of parts of the index that correspond to objects that are related therebetween by having more than one similar property, optionally providing replications of parts of the index that correspond to objects having resembling though not common properties and/or properties that are partly common or shared by the objects. For example, providing replications of parts of the index that correspond to objects of the same department regardless of properties but, optionally, that the objects have access permission for the client computer and/or operator thereof. As a further example, providing replications of a part of the index that correspond to objects that are related therebetween by any other relationship, such as objects residing in a certain part of the enterprise or objects that were backed-up within a certain time, optionally the object having some relationship with the client computer such as access permission for the operator of the client computer.

It is noted that objects may be related by any combination of properties thereof and/or any other relationships.

Generally and without limiting, the related objects comprise a subset of the objects of the enterprise, where one subset of related objects may, at least partly, coincide with another subset of related objects. Yet, in some embodiments or cases, a subset of related objects includes all the objects of the enterprise, for example, when the enterprise only has related objects, so that a subset of related objects includes the set of objects of the enterprise rather than a part of the set of objects of the enterprise.

In some embodiments, the provided replications of entries are constructed in an index of the client computer, so that, optionally, the client computer may locally query about objects in a analogous manner as querying the enterprise, yet independently of the enterprise.

It is emphasized that the entries comprise data of and/or based and/or derived from the contents of the corresponding objects. Thus, queries or searches with criteria that relate to contents of objects corresponding to the replications of entries can be carried out based on the entries without actually accessing the objects.

In some embodiments, the replications of parts of an index of an enterprise are not necessarily exact duplications of entries of the index as long as the replications comprise data of and/or derived from the contents of the objects as reflected in the entries. For example, the replications may not include administrative data of the enterprise with respect to the index and/or entries thereof, or the replication may be constructed in a different manner relative to the constructions of the entries of the index of the enterprise.

For brevity, a query and/or request and/or any other operation of the client computer with the enterprise regarding objects of the enterprise are also referred to as an interaction of the client computer with the enterprise with respect to objects of the enterprise, where referring to objects of the enterprise does not preclude referring to one object thereof.

FIG. 1A schematically illustrates an enterprise 100 as a computerized system and a client computer 120 connectable and/or connected to enterprise 100 via a communication link 118, according to exemplary embodiments of the disclosed subject matter. The connection or link of client computer 120 to enterprise 100 may be direct and/or indirect via interconnections of components and/or computers of enterprise 100.

Enterprise 100 comprises a storage 116, representing any number of storage devices, which stores therein objects 130 of enterprise 100. Objects 130 are illustrated by object 130a to object 130e, representing any number of objects as illustrated by triplet-dots 138. Any object of objects 130 may be a simple or a basic object or file, such as represented by object 130c, or may be a compound or a container of other objects as represented, for example, by object 130a.

Enterprise 100 comprises an index-storage 112 that stores and maintains an index 110 of objects 130, as illustrated by dotted lines 192 extending from index-storage 112.

Index 110 comprises entries 102 respective or corresponding to objects 130, as further illustrated by triplet-dots 108.

Enterprise 100 also comprises a properties-storage 114 that stores and maintains properties of objects 130 in a construct such as list and/or a catalog and/or database respective to objects 130, for brevity referred to as a properties-catalog (not shown).

In some embodiments, client computer 120 represents any number of client computers, denoted as a client computer 120a to a client computer 120n, as illustrated also by a dashed line 196, and connectable and/or connected to enterprise 100, directly and/or indirectly, via a communication link 118a to a communication link 118n, respectively.

By way of example, entries 102 respective to object 130a and object 130b are denoted as entries 104, and entries 102 respective to object 130c to object 130e are denoted as entries 106. Further by way of example, entries 106 correspond to similar objects as judged by and/or based on the properties of objects 130, such as in the properties-catalog, with respect to object 130c to object 130e. Yet further by way of example, client computer 120 is linked to enterprise 100.

Thus, in some embodiments, upon certain circumstances, some of which described above, enterprise 100 sends replications of entries 106 to client computer 120 via communication link 118. Having received replications of entries 106, client computer 120 can and/or may un-link and/or disconnect from enterprise 100 and still be able to query about objects that correspond to entries 106.

It is noted that by the way of example object 130c to object 130e are a subset of objects 130, yet the subset of object 130c to object 130e represents any subset of objects 130 that are related therebetween based on at least one property thereof.

FIG. 1B schematically illustrates enterprise 100 and client computer 120 after receiving of replications 122 of entries 106 of index 110 that correspond to object 130c to object 130e, according to exemplary embodiments of the disclosed subject matter. Client computer 120 is disconnected from enterprise 100 as schematically illustrated by a broken arrow 198 rather than communication link 118.

It is also noted that in case objects corresponding to entries in client computer 120, such as replications 122 of entries 106, are modified and/or deleted in enterprise 100, in some embodiments enterprise 100 amends the entries in client computer 120 accordingly, either by pushing and/or responsive to client computer 120 linking to enterprise 100.

In some embodiments, client computer 120 is configured to receive replications 122 of entries 106 such as in index 124 thereof, either responsive to query and/or request from enterprise 100 and/or by enterprise 100 that pushes replications 122 of entries 106 to client computer 120. Likewise, in some embodiments, enterprise 100 is configured to provide replications 122 of entries 106 and/or amended entries to client computer 120 either by a response to client computer 120 and/or by pushing of replications 122 to client computer 120.

In some embodiments, client computer 120 comprises in a storage thereof an index 124, as illustrated schematically by dotted lines 194. Accordingly, in some embodiments, client computer 120 stores replications 122 of entries 106 in index 124 as a local index of client computer 120. Thus, querying about objects respective to replications 122 can or may be executed locally in a manner akin to querying about objects in enterprise 100 when client computer 120 is linked with enterprise 100.

It is noted that the description with respect to client computer 120 is by way of example, and may and/or does apply to any one of client computer 120a to client computer 120n. Further, any one of client computer 120a to client computer 120n may be provided with replications of entries corresponding to a different subset of objects rather than object 130c to object 130e.

In some embodiments, enterprise 100 comprises one or more processing components (not shown) as one or more processors and/or computers, and a program operable and/or operative in the one or more processing components to carry out the operations according to the operation exemplified above, though not limited to the operation exemplified above.

It is noted that reference to a plurality of entries and replications thereof does not preclude an entry corresponding to one object and a replication of the entry. For example, the enterprise provides a replication of an entry corresponding to one object associated, such as by ownership, with an operator of client computer connected to the enterprise. Further, optionally, based on the received replication the client computer is provided with more replications of entries corresponding similar objects as the one object.

It is also noted that index-storage 112 and/or properties-storage 114 may be implemented in a plurality of devices.

It is noted that index 110 and the properties-catalog may be combined, such as in a database and/or another construct such as a list.

FIG. 2 outlines operation of a computerized system for enabling querying independently of the enterprise about objects thereof, according to exemplary embodiments of the disclosed subject matter.

In operation 202 replications of entries of an index of the computerized system that comprise data derived from contents of the objects are provided by the computerized system to a computer linked to the computerized system, where said entries correspond to a subset of objects of the computerized system that are identified as related objects.

For example, referring to the example with respect to FIGS. 1A-1B, replications 122 of entries 106 that correspond to object Thus, based on the provided replications, the computer is enabled to query locally and independently of the computerized system about the related objects according to contents thereof, also when the computer is not linked to the computerized system.

FIG. 2B outlines operations of a computerized system for enabling querying independently of the enterprise about objects thereof as a non-limiting exemplary elaboration of operation 202 of FIG. 2A, according to exemplary embodiments of the disclosed subject matter.

In operation 212 related objects of a computerized system are identified based on at least one property of the objects of a computerized system.

For example, objects referred to in an interaction of a computer linked to the computerized system and/or objects associated with the computer and/or the objects that relate to or associated with an operator of the computer are identified based on one more properties of the objects that are at least partially common among the objects, such as ownership, access permission, access history and/or other properties such as classification.

In operation 214 entries corresponding to the identified objects in an index of the computerized system are determined.

In operation 216 replications of the determined entries are formed. In some embodiments, the replications are constructed in a different manner relative to the corresponding entries of the index of the computerized system, but preserve the data derived from contents of the objects as constructed and/or stored in the entries of the index.

In operation 218 the computerized system sends the replications to a computer linked to the computerized system. Generally, without limiting, the replications are sent to the computer by which or according to which the objects were referred to as exemplified above.

There is thus provided according to the present disclosure a method for enabling querying independently of a computerized system about objects thereof, comprising providing a computer linked to the computerized system with replications of entries of an index of the computerized system that comprise data derived from contents of the objects, where said entries correspond to a subset of objects that are identified as related objects, thereby enabling the computer, based on the provided replications, to query locally and independently of the computerized system about the related objects according to contents thereof.

In some embodiments, the objects of the subset of objects are identified as related objects based on at least one property of the subset of objects.

In some embodiments, the at least one property comprises a property common to the subset of objects.

In some embodiments, the at least one property comprises a property that is at least partly common to the subset of objects.

In some embodiments, he at least one property comprises a similar property of the subset of objects.

In some embodiments, the at least one property comprises a plurality of properties having at least one relationship therebetween.

In some embodiments, providing the computer with replications of entries of the index is carried out by the computerized system responsive to connection of the computer to the computerized system.

In some embodiments, providing the computer with replications of entries of the index is carried out by the computerized system responsive to an interaction of the computer with the computerized system with respect to the objects of the computerized system.

In some embodiments, the interaction comprises a query by the computer about at least one of the objects of the computerized system.

In some embodiments, the interaction comprises a request by the computer for at least one of the objects of the computerized system.

In some embodiments, providing to the computer with replications of entries of the index is initiated by the computerized system.

In some embodiments, the replications of entries of the index of the computerized system are constructed in the computer in a local index of the computer.

In some embodiments, the replications of entries of the index of the computerized system are formed in a different manner relative to entries of the index of the computerized system.

There is thus further provided according to the present disclosure an apparatus for enabling querying independently of a computerized system about objects thereof, comprising a computerized system comprising an at least one storage device storing an index of objects of the computerized system and an at least one processing component, wherein the computerized system is configured by a program operable in the at least one processing component to provide an at least one computer with replications of entries of the index that comprise data derived from contents of the objects, where said entries correspond to a subset of objects that are identified as related objects, thereby enabling the at least one computer, based on the provided replications, to query locally and independently of the computerized system about the related objects according to contents thereof.

In some embodiments, the program is operative to provide the at least one computer with replications of entries of the index when the at least one computer is connected to the computerized system.

In some embodiments, the program is operative to provide the at least one computer with replications of entries of the index responsive to a connection of the at least one computer to the computerized system.

In some embodiments, the program is operative to provide the at least one computer with replications of entries of the index responsive to an interaction of the at least one computer with respect to at least one object of the computerized system.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or is portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A method for a client computer to independently query a computerized system about objects thereof, the computerized system including an index of objects with entries of information about respective objects and a properties catalog storing with respect to each entry properties of the respective object, the method comprising:
    in a processor of a client computer, sending to the computerized system externally linked to the client computer, a query about a first object having a respective entry in the index stored in the computerized system, so as to cause the computerized system to identify, based on at least one property stored in the properties catalog, a relation between the queried first object to at least one second object similar to the queried first object, and respectively having at least one entry in the stored index;
    receiving, by the processor of the client computer from the computerized system, replications of the respective stored entries of the queried first object and the at least one second object similar to the queried first object;
    receiving, by the processor, replications of entries corresponding to objects of the computerized system that were previously created or modified by the client computer, that are pushed by the computerized system to the client computer upon the computerized system identifying when the client computer creates or modifies objects of the computerized system, and
    querying, by the processor, locally and independently of the computerized system, objects related to objects previously handled by the client computer using the provided replications.

2. The method according to claim 1, wherein the at least one property comprises a property common to the queried first object and the at least one second object.

3. The method according to claim 1, wherein the at least one property comprises a property that is at least partly common to the queried first object and the at least one second object.

4. The method according to claim 1, wherein the at least one property comprises a similar property of the queried first object and the at least one second object.

5. The method according to claim 1, wherein the at least one property comprises a plurality of properties having at least one relationship therebetween.

6. The method according to claim 1, wherein receiving the replications of the respective stored entries of the first object and the at least one second object is responsive to connection of the client computer to the computerized system.

7. The method according to claim 1, wherein receiving the replications of the respective stored entries of the queried first object and the at least one second object is responsive to an interaction of the client computer with the computerized system with respect to the objects of the computerized system.

8. The method according to claim 7, wherein the interaction comprises a query by the client computer about at least one of the objects of the computerized system.

9. The method according to claim 7, wherein the interaction comprises a request by the client computer for at least one of the objects of the computerized system.

10. The method according to claim 1, wherein receiving by the client computer replications of the respective stored entries of the queried first object and the at least one second object is initiated by the computerized system.

11. The method according to claim 1, wherein the replications of the respective stored entries of the queried first object and the at least one second object are constructed in the client computer.

12. The method according to claim 1, wherein the replications of the respective stored entries of the queried first object and the at least one second object are formed in a different manner relative to entries of the queried first object and the at least one second object of the computerized system.

13. The method according to claim 1, wherein the at least one property is selected from a group consisting of: ownership, access histories, permissions and classifications.

14. The method according to claim 1, further comprising locally querying, by the processor, about objects without querying the index when the computerized system replicates at least a part of the index in the client computer, based on a certain circumstance or an event, prior to the client computer sending the query to the computerized system.

15. A client computer to independently query a computerized system about objects thereof, the computerized system including an index of objects with entries of information about respective objects and a properties catalog storing with respect to each entry properties of the respective object, the client computer comprising:
    a memory; and
    a processor configured to execute a code, the code comprising instructions for:
        sending to the computerized system externally linked to the client computer, a query about a first object having a respective entry in the index stored in the computerized system, so as to cause the computerized system to identify, based on at least one property stored in the properties catalog, a relation between the queried first object to at least one second object similar to the queried first object, and respectively having at least one entry in the stored index;
        receiving from the computerized system, replications of the respective stored entries of the queried first object and the at least one second object similar to the queried first object;
        receiving replications of entries corresponding to objects of the computerized system that were previously created or modified by the computer, that are pushed by the computerized system to the client computer upon the computerized system identifying when the client computer creates or modifies objects of the computerized system, and
        querying, locally and independently of the computerized system, objects related to objects previously handled by the client computer using the provided replications.

16. The client computer according to claim 15, wherein the code comprises instructions for providing the client computer with replications of entries of the index when the client computer is connected to the computerized system.

17. The client computer according to claim 15, wherein the code comprises instructions for providing the client computer with replications of entries of the index responsive to a connection of the client computer to the computerized system.

18. The client computer according to claim 15, wherein the code comprises instructions for providing the client computer with replications of entries of the index responsive to an interaction of the client computer with respect to the first object of the computerized system.

19. The client computer according to claim 15, wherein the at least one property is selected from a group consisting of: ownership, access histories, permissions and classifications.

20. The client computer according to claim 15, wherein the code comprises instructions for locally querying about objects without querying the index, when the computerized system replicates at least a part of the index in the client computer, based on a certain circumstance or an event, prior to sending the query to the computerized system.

* * * * *